April 13, 1937.   J. A. KENNEDY   2,076,729
LATEX TREATED TUBING
Original Filed Jan. 22, 1932
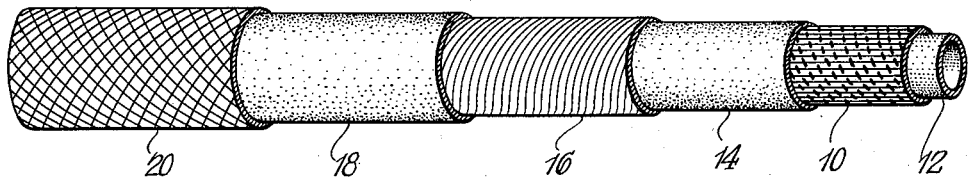
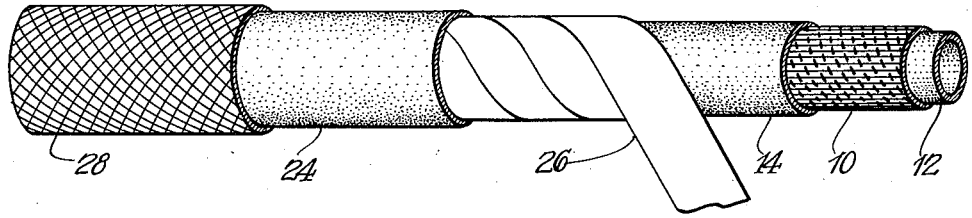
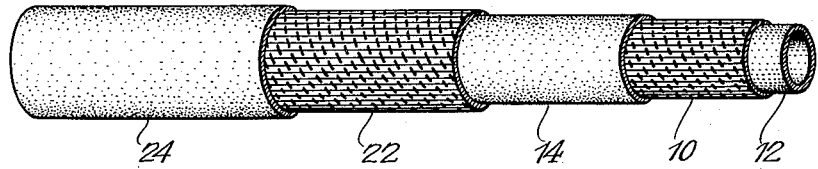
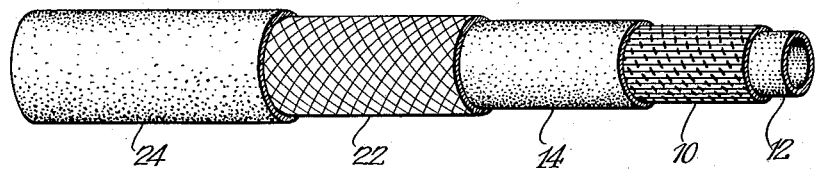
INVENTOR.
JOSEPH A. KENNEDY.
BY
ATTORNEYS Patented Apr. 13, 1937

2,076,729

UNITED STATES PATENT OFFICE 2,076,729

LATEX TREATED TUBING

Joseph A. Kennedy, Pawtucket, R. I., assignor to Anaconda Wire & Cable Company, New York, N. Y., a corporation of Delaware Original application January 22, 1932, Serial No. 588,157, now Patent No. 2,019,709, dated November 5, 1935. Divided and this application May 22, 1935, Serial No. 22,719

4 Claims. (Cl. 138—55)

The present application is a division of my application Serial No. 588,157, filed January 22, 1932, relating to latex treated tubing, now Patent 2,019,709, of November 5, 1935.

This invention relates to improvements in non-metallic tubing, the particular feature of novelty residing in forming extremely flexible hose or tubing with several plies of woven or braided tubes with coatings of unmasticated rubber or synthetic rubber applied in the form of latex, or an aqueous dispersion of rubber-like material to the inner raceway of the tube, as well as between the plies of a woven or braided tubing. An important feature of the invention resides in the incorporation of one or more thin layers of rubber in the form of latex in the tube structure, so as to provide rubber-like films of great purity and to produce a tube of great flexibility and long useful life. The above and other features of the invention will be fully apparent from the following specification when read in connection with the accompanying drawing and will be pointed out with particularity in the appended claims.

In the drawing—

Fig. 1 is a view of a piece of tubing embodying the invention, certain layers thereof being broken away to reveal the structural assembly of the tube.

Figs. 2, 3 and 4 are views illustrating alternative embodiments of the invention.

An important feature of the invention resides in incorporating in the tube structure one or more layers of extremely pure unmasticated rubber or synthetic rubber. The unmasticated rubber, which is incorporated in my improved tubing is of extreme purity because it has not been contaminated by the incorporation of foreign matter. The usual forms of masticated rubber heretofore used include impurities which become intermixed at the time the crude rubber is prepared. The usual mastication is considered necessary to remove these impurities in part. Such mastication breaks the fiber structure to a certain extent. The unmasticated rubber, which I incorporate in my tube structure is thought to endow the latter with longer life, greater flexibility and elasticity without rupture or breakage, while at the same time utilizing a relatively thinner layer than that required when ordinary rubber is to be used. This effects important manufacturing economies.

The rubber or rubber-like layers incorporated in my improved tube structure may be applied in the form of latex including the usual preservatives, accelerators, fillers and the like. The latex will usually be applied in the form of an aqueous dispersion of latex or rubber, either vulcanized, or unvulcanized. Unvulcanized latex is preferable in some cases and when used the latex layers, or films, hereinafter referred to, will be self-curing. The application of latex in liquid or semi-liquid form to tubing enables me to incorporate in the tube structure an unmasticated body of rubber or rubber-like material of great purity and long life.

In the simplest form of the invention, I will provide an innermost woven tube, such as indicated at 10 in Fig. 1. This tube may be formed of longitudinal cotton warp strands and interwoven woof strands formed of twisted paper. An aqueous dispersion of latex will be either sprayed on the interior of the tube, or extruded from a mandrel over which the tube is woven. This will form the innermost impervious layer, indicated at 12. After this layer becomes self-cured, it will form an impervious film of unmasticated rubber. This rubber will extend between the interstices of the cotton warp and helical twisted paper strands and another layer of rubber-like material, as indicated at 14, will be applied and bonded thereto also in the form of an aqueous dispersion of latex or its equivalent. The latter layer may be applied by spraying, or alternatively, by passing the tube through a bath of latex.

In some cases, there will be applied a serving of yarn, as indicated at 16. And over this, will be applied another coating of latex, or other liquid compound capable of forming a synthetic rubber, either by spraying, or otherwise, thus forming the layer 18 of rubber, or synthetic rubber. Over this, there is applied a braid 20 treated either with latex, or a protective coating of lacquer.

In the embodiment shown in Fig. 2, the inner tube 10 and the layer 14 are substantially the same as described in connection with Fig. 1, but over the layer or film 14, there is a woven or braided cover of suitable cotton or yarn, indicated at 22. This in turn is covered or impregnated with an aqueous dispersion of latex, forming a relatively thin rubber-like layer 24.

In the modification of Fig. 3, the innermost tube 10 has an inner raceway treated either with latex, as above, or alternatively with asphalt, or an oxidizing varnish. Over the tube 10, there is a layer 14 formed by applying latex, as above described. This layer 14 is covered with a wrapping of tape 26 formed of either paper, or cotton. The tape layer has a coating 28 formed by applying latex thereto and the outer coat is in the form of a braided or woven jacket 28 treated with latex, asphalt, paint, varnish, or lacquer.

In the embodiment of the invention illustrated in Fig. 4, the inner woven tube 10, the covering 14 and the woven or braided jacket 22 are substantially the same as illustrated and described in connection with Fig. 2, the interior raceway of the tube 10, however, in this instance being treated with lacquer instead of latex and the exterior of the jacket 22 being treated with either latex, lacquer, or suitable asphalt, or varnish protective coating.

In my improved method of manufacturing tubular products, the latex can be applied by spraying on the interior raceway surface of the innermost tube, or the relatively liquid latex can be flowed on by extruding the same from the interior of a spindle over which the innermost tube 10 is woven. The other latex layers, such as indicated at 14 and 18 in Fig. 1 and at 14 and 24 in Fig. 2, at 14 and 28 in Fig. 3 and at 14 and 24 in Fig. 4 are preferably applied by spraying the material over the underlying structures. Or, instead of spraying, in some cases, the tubing may be merely run through a bath of relatively liquid latex.

The latex incorporated in the tube structure, when dried by exposure to air, is self-curing and in the completed tube it forms a thin homogeneous elastic unmasticated rubber-like layer, or coating, which is impervious to oil, water, air, etc. This material, when applied by spraying, or by immersing the article in a liquid bath, forms a thin relatively pure rubber-like film, which is tough and elastic. The latex, when applied over a tube formed of cotton warp and twisted paper woof or filling strands increases the flexibility of the tube. While I have specifically referred to latex, it is to be understood that other self-curing materials capable of forming an imperivous flexible coating may be substituted therefor without departure from the invention.

In some cases, the woven tube 10 instead of being composed of cotton warp strands and twisted paper helical woof strands, may be formed of cotton warps and cotton woofs, or jute warp and jute woofs, or paper warp and paper woofs. Also, the tube may consist of cotton warp strands and hemp or jute helical woof strands. The jute may be impregnated thoroughly with asphalt and the inner raceway may have a coating of latex applied thereto, as above described, for water-proofing purposes. The outer surface of the tube may be treated with stearin pitch, over which may be applied an outer coating of latex in order to provide a flexible, elastic, outer water-proofing coating. I also contemplate, in some cases, to include in the tubing assemblies the use of gums, asphalts, pitches and silicates, as intermediate films between the rubber-like coatings which are applied in the form of latex.

While I have described quite precisely certain specific features of the embodiments of the invention herein illustrated and have referred to definite steps in its mode of manufacture, it is to be understood that various modifications in the structure and its method of production may be made by those skilled in the art without departing from the invention as defined in the appended claims.

What I claim is:

1. A flexible article of the character described comprising an innermost woven tube, whose inner raceway includes a coating of impervious lacquer, a thin layer or film of self-cured rubber latex over said tube, a braided jacket over said layer and a protective film of latex rubber over said braided jacket.

2. A woven tube comprising cotton warp strands and helical woof strands of fibrous material such as hemp or jute, said fibrous strands being impregnated with asphalt, a coating of unmasticated rubber lining the inner raceway of the tube, a coating of stearin pitch over the exterior of the tube and a coating of unmasticated rubber which is the residue of an original aqueous dispersion of latex enveloping the stearin pitch coating on the tube.

3. A tubing of the character described including an innermost fabric tube, whose inner raceway is treated with an impervious material other than rubber and whose outer surface is impregnated and coated with rubber body which is the residue of a watery dispersion of latex and a protective jacket for the latter latex body.

4. An article of the character described including an inner woven tube, whose inner raceway has an impervious film of self-cured latex rubber secured thereto, a layer of self-cured latex rubber enveloping said inner tube, a wrapping of tape enclosing the latter, a layer of self-cured latex enclosing said wrapping and a protective jacket of interconnected strands enclosing the assembly and treated with a protective coating material.

JOSEPH A. KENNEDY.